R. A. TURLINGTON.
EGG TESTER.
APPLICATION FILED FEB. 8, 1916.
1,202,455.
Patented Oct. 24, 1916.
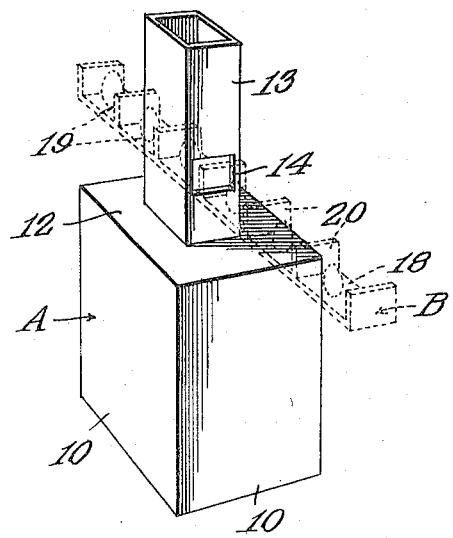
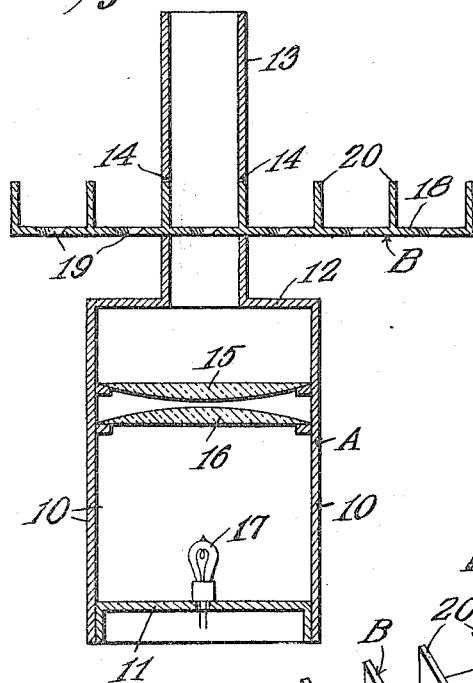
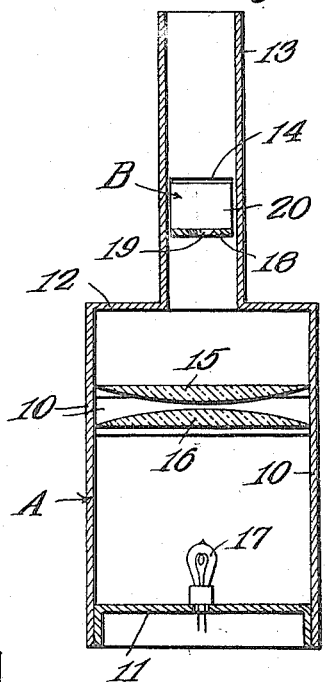
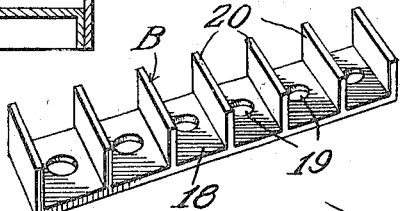
Witnesses
James F. Crown
Henry D. Bright
Inventor
R. A. Turlington,
By
Attorneys

UNITED STATES PATENT OFFICE.

RANDALL A. TURLINGTON, OF WILSON, NORTH CAROLINA.

EGG-TESTER.

1,202,455.  Specification of Letters Patent.  Patented Oct. 24, 1916.

Application filed February 8, 1916.  Serial No. 76,953.

*To all whom it may concern:*

Be it known that I, RANDALL A. TURLINGTON, a citizen of the United States, residing at Wilson, in the county of Wilson, State of North Carolina, have invented certain new and useful Improvements in Egg-Testers; and I do hereby declare the following to be a full, clear, and exact description of the invention, such as will enable others skilled in the art to which it appertains to make and use the same.

The invention relates to egg-testers.

The object of the invention is to provide a simple and efficient device for ascertaining the condition of eggs and which is so constructed that a large number of eggs can be examined in a relatively short period of time.

A further object of the invention is to provide a device of the character named embodying relatively few parts and which can be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a perspective view of an egg-tester constructed in accordance with the invention; Fig. 2, a vertical section of the device; Fig. 3, a vertical section taken at right angles to that disclosed in Fig. 2, and Fig. 4, a perspective view of the egg carrier or tray.

Referring to the drawings the invention is shown as comprising a body casing A including the usual side members 10, bottom 11 and top 12. Rising from the top 12 is a tubular member 13 which communicates with the interior of the body A. The opposite walls of the tubular member 13 are provided with alined openings 14 for a purpose that will presently appear. Mounted within the body A are condensing lenses 15 and 16. Disposed beneath the lens 16 and mounted on the bottom 11 is an electric lamp 17 which may be connected with a suitable electric source in any desired manner. Adapted to move through the openings 14 is an egg carrier or tray B which includes a bottom 18 provided with a plurality of perforations 19 in which the eggs to be tested are adapted to seat. Rising from the bottom 18 at the ends thereof and between adjacent perforations 19 are shield plates 20. These plates are spaced apart the width of the member 13 and are of a size equal to the size of the openings 14 so that when an egg is disposed within the member 13 in a position to be tested the plates 20 will close the openings 14 and retain all the light in the member 13.

The operation of the device will be obvious. After the eggs are seated in the perforations 19 the carrier or tray B is passed progressively through the openings 14 and the condition of each egg is observed by looking through the upper end of the member 13, the light of the lamp reflected through the lenses 15 and 16 and through the member 13 will enable the condition of the eggs to be readily ascertained in the well known manner.

What is claimed is:—

An egg testing device comprising a casing, a lamp in said casing, a tubular extension rising from the top of the casing and communicating with the interior of the latter, means for projecting the light rays of the lamp through the tubular extension, and an egg carrier slidable through alined openings in the tubular extension, said carrier including a base provided with a plurality of perforations in which the eggs are adapted to seat, and shield plates rising from the ends of the base and between adjacent perforations respectively, said plates closing the openings in the tubular extension when the carrier is in a testing position.

In testimony whereof I affix my signature in the presence of two witnesses.

RANDALL A. TURLINGTON.

Witnesses:
 E. H. ANDERSON,
 R. B. SIMPSON.

Copies of this patent may be obtained for five cents each, by addressing the "Commissioner of Patents, Washington, D. C."